US011066163B2

(12) United States Patent
Kimchi et al.

(10) Patent No.: US 11,066,163 B2
(45) Date of Patent: Jul. 20, 2021

(54) DISTRIBUTED AND RECONFIGURABLE AERIAL VEHICLE CONFIGURATION

(71) Applicant: Amazon Technologies, Inc., Seattle, WA (US)

(72) Inventors: Gur Kimchi, Bellevue, WA (US); Louis LeRoi LeGrand, III, Seattle, WA (US); Ricky Dean Welsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 15/789,192

(22) Filed: Oct. 20, 2017

(65) Prior Publication Data
US 2019/0118944 A1  Apr. 25, 2019

(51) Int. Cl.
*B64C 39/02*  (2006.01)
*G08G 5/00*  (2006.01)
(Continued)

(52) U.S. Cl.
CPC ............ *B64C 39/024* (2013.01); *B64C 15/12* (2013.01); *B64D 1/22* (2013.01); *G05D 1/104* (2013.01);
(Continued)

(58) Field of Classification Search
CPC ................ B64D 1/22; B64C 2201/143; B64C 2201/128; B64C 2201/148;
(Continued)

(56) References Cited

U.S. PATENT DOCUMENTS 3,601,342 A * 8/1971 Piasecki ................... B64D 1/22
244/137.4
9,079,662 B1 * 7/2015 Duffy ...................... B64C 37/02
(Continued)

FOREIGN PATENT DOCUMENTS

EP  2881324 A1  6/2015
KR  101614620 B1  4/2016
(Continued)

OTHER PUBLICATIONS

International Search Report for International Application No. PCT/US2018/055439, dated Jan. 21, 2019.
(Continued)

*Primary Examiner* — Assres H Woldemaryam
(74) *Attorney, Agent, or Firm* — Athorus, PLLC

(57) ABSTRACT

Systems and methods to form distributed and reconfigurable aerial vehicle configurations are described. An aerial vehicle configuration may include a plurality of aerial vehicles that are connected to a payload via respective tethers in order to complete a task, e.g., delivery of the payload to a location. The plurality of aerial vehicles selected as part of the aerial vehicle configuration may be of various types and may form a particular initial configuration. During operation, the aerial vehicle configuration may be modified based on changes to various operating parameters associated with aerial vehicles, the aerial vehicle configuration, the task, and/or the environment. The modifications may include changing positions, altitudes, and/or orientations of aerial vehicles with respect to each other and/or the payload, releasing aerial vehicles from the configuration, or adding new aerial vehicles to the configuration.

19 Claims, 9 Drawing Sheets

(51) Int. Cl.
*B64D 1/22* (2006.01)
*B64C 15/12* (2006.01)
*G05D 1/10* (2006.01)
*B64C 7/00* (2006.01)

(52) U.S. Cl.
CPC ......... *G08G 5/0008* (2013.01); *G08G 5/0021* (2013.01); *G08G 5/0052* (2013.01); *G08G 5/0069* (2013.01); *G08G 5/0091* (2013.01); *B64C 7/00* (2013.01); *B64C 2201/024* (2013.01); *B64C 2201/042* (2013.01); *B64C 2201/108* (2013.01); *B64C 2201/126* (2013.01); *B64C 2201/128* (2013.01); *B64C 2201/143* (2013.01); *B64C 2201/165* (2013.01); *B64C 2211/00* (2013.01)

(58) Field of Classification Search
CPC ... B64C 2211/00; B64C 39/024; B64C 15/12; B64C 2201/165; B64C 2201/126; B64C 2201/108; B64C 2201/042; B64C 2201/024; B64C 7/00; G08G 5/0091; G08G 5/0052; G08G 5/0008; G08G 5/0021; G08G 5/0069; G05D 1/104
See application file for complete search history.

(56) References Cited

U.S. PATENT DOCUMENTS

| | | | | |
|---|---|---|---|---|
| 9,676,481 | B1 * | 6/2017 | Buchmueller | B64D 1/12 |
| 10,180,687 | B2 * | 1/2019 | Vander Lind | B64D 3/00 |
| 2015/0120126 | A1 * | 4/2015 | So | G01C 23/00 701/26 |
| 2016/0351089 | A1 | 12/2016 | Salem | |
| 2018/0072421 | A1 * | 3/2018 | Prager | B64D 1/22 |
| 2018/0188724 | A1 * | 7/2018 | Jassowski | B64D 1/22 |

FOREIGN PATENT DOCUMENTS

| | | | | |
|---|---|---|---|---|
| WO | 2017173502 A1 | 10/2017 | | |
| WO | WO-2017173502 A1 * | 10/2017 | ........... | B64C 39/024 |

OTHER PUBLICATIONS

Ascent AeroSystems, "Sprite: portable and rugged. A totally different drone," downloaded Sep. 14, 2017, 14 pages.

* cited by examiner

DISTRIBUTED AND RECONFIGURABLE AERIAL VEHICLE CONFIGURATION

BACKGROUND

Aerial vehicles are increasing in use for various purposes. Generally, aerial vehicles may be designed and configured for specific purposes, conditions, and/or environments. However, such specifically designed and configured aerial vehicles do not have the flexibility to adapt in real-time to changing purposes, conditions, and/or environments. Accordingly, there is a need for distributed and reconfigurable aerial vehicle configurations that can adapt in real-time to changing purposes, conditions, and/or environments for optimal performance.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
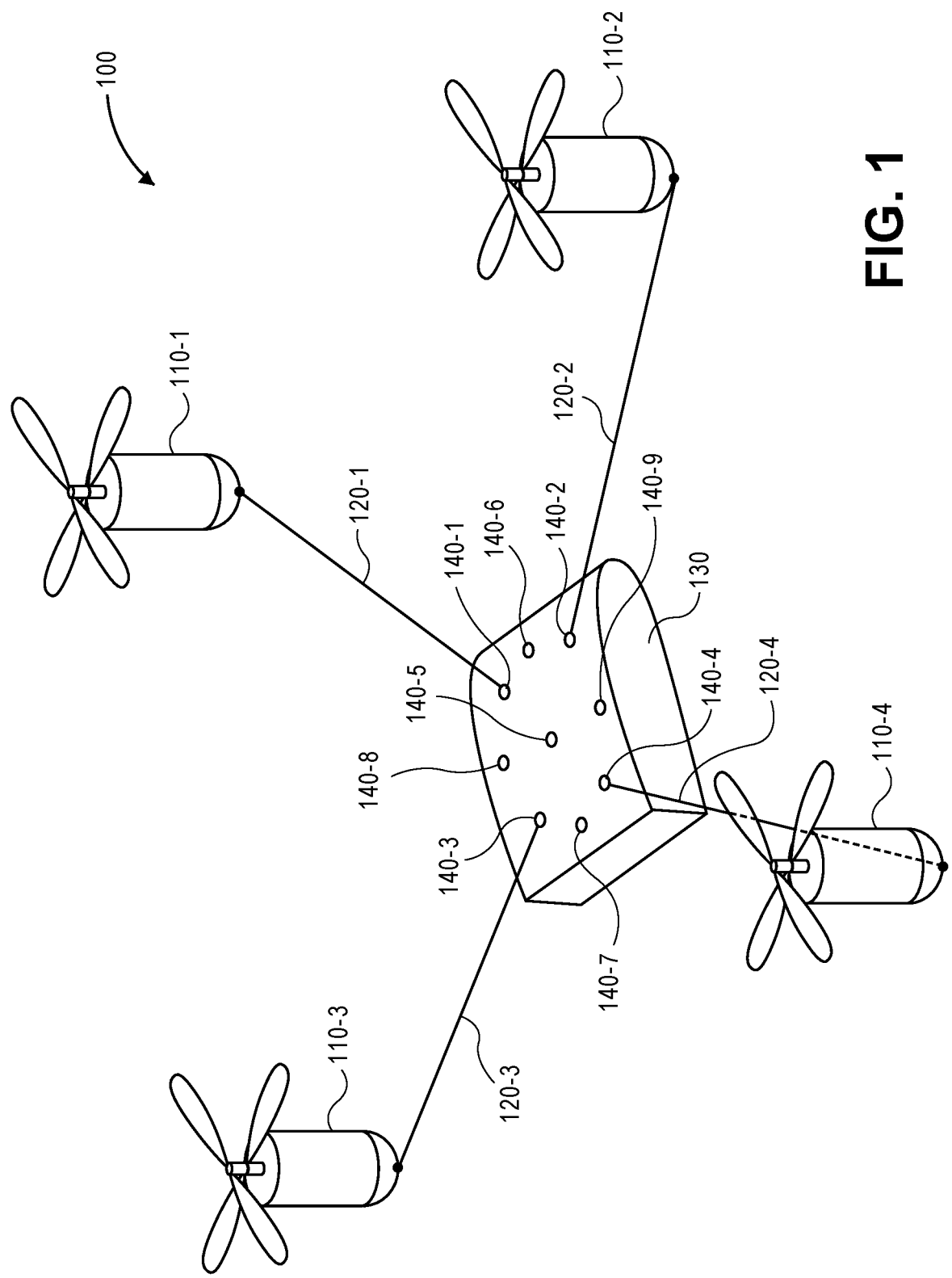
FIG. 1 is a schematic diagram of an example reconfigurable aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to form, operate, and reconfigure various aerial vehicle configurations having a plurality of aerial vehicles are described. The aerial vehicle configurations may be reconfigurable and distributed. For example, the aerial vehicle configurations may include a plurality of aerial vehicles of one or more aerial vehicle types, a payload, and tethers that couple each of the plurality of aerial vehicles to the payload.

In some embodiments, each aerial vehicle may include two stacked, counter-rotating propellers that are each operatively connected to a respective motor. Each aerial vehicle may also include a controller or control system that enables operation of the aerial vehicle independently of any other aerial vehicles. In addition, each of the plurality of aerial vehicles may include a plurality of sensors to detect aspects of the payload, other aerial vehicles of the plurality of aerial vehicles in the aerial vehicle configuration connected to the payload, and/or the environment. Further, when a plurality of aerial vehicles are coupled to a payload in an aerial vehicle configuration, each of the controllers of the plurality of aerial vehicles may cooperate to collectively operate the aerial vehicle configuration, e.g., as a distributed controller.

Each aerial vehicle may also include a tether and/or a tether mechanism. For example, in some embodiments, the tether may have a defined length and a fixed connection to the aerial vehicle. Likewise, an opposite end of the tether may also have a fixed connection to a payload. In other embodiments, the tether may have a variable length and a releasable connection to the aerial vehicle. Likewise, an opposite end of the tether may also have a releasable connection to a payload. Various combinations of defined lengths, variable lengths, fixed connections, and/or releasable connections of tethers with respect to the aerial vehicle and/or the payload may be possible as described herein.

An aerial vehicle configuration may be determined and formed for a task, such as delivery of a payload to a location, based on information associated with the payload and/or information associated with the task. For example, the determined aerial vehicle configuration may have any combination of type, number, arrangement, and/or orientation of aerial vehicles. During operation of the aerial vehicle configuration to perform the task, various operating parameters associated with the aerial vehicle configuration, each aerial vehicle, and/or the task may be monitored to determine whether any changes to the aerial vehicle configuration are desired. If desired, the aerial vehicle configuration may be reconfigured in various ways, including modifying positions, altitudes, and/or orientations of one or more aerial vehicles of the aerial vehicle configuration, releasing one or more aerial vehicles from the aerial vehicle configuration, and/or connecting one or more new aerial vehicles to the aerial vehicle configuration.

FIG. 1 is a schematic diagram of an example reconfigurable aerial vehicle configuration 100, according to an implementation.

The aerial vehicle configuration 100 may include a plurality of aerial vehicles 110, e.g., two or more aerial vehicles 110. Each aerial vehicle 110 may comprise any type of aerial vehicle, e.g., an aerial vehicle with two stacked, counter-rotating propellers, a quadcopter, a hexacopter, an octocopter, or any other type of aerial vehicle. In addition, each aerial vehicle 110 may include a controller that enables operation of each aerial vehicle independently of any other aerial vehicles 110. Further, the controllers of the aerial vehicles 110 that form the aerial vehicle configuration 100 may also cooperate to collectively operate the aerial vehicle configuration 100 together, e.g., as a distributed controller. For example, for any example aerial vehicle configuration 100, the controllers of the aerial vehicles 110 may collectively control their respective operations to form and/or maintain relative positions, altitudes, and/or orientations with respect to other aerial vehicles 110 in the aerial vehicle configuration 100 and/or a payload.

Although FIG. 1 shows an aerial vehicle configuration 100 including four aerial vehicles 110-1, 110-2, 110-3, 110-4 each having two stacked, counter-rotating propellers, any other number, types, arrangements, combinations, and/or orientations of aerial vehicles 110 may form an aerial vehicle configuration 100. For example, an example aerial vehicle configuration may include one quadcopter and a plurality of aerial vehicles having two stacked, counter-rotating propellers that are each connected to a payload. Likewise, various other numbers, types, combinations, arrangements, and/or orientations of aerial vehicles may form an aerial vehicle configuration.

In addition, each aerial vehicle 110 may be connected to a payload 130 via a tether 120. Each tether 120 may have a defined length or may have a variable length, e.g., the tether 120 may be extendible, retractable, telescoping, or otherwise flexible. In addition, each tether 120 may have fixed connections 140 and/or releasable connections 140 to a respective aerial vehicle 110 and/or to a payload 130. For example, the fixed connections 140 may include fasteners, adhesives, ball and socket connections, or other fixed connections. In addition, the releasable connections 140 may include key and keyhole connections, hook and ring connections, magnetic connections, suction connections, or other releasable connections.

Although FIG. 1 shows an aerial vehicle configuration 100 including four aerial vehicles 110-1, 110-2, 110-3, 110-4 each having one tether 120-1, 120-2, 120-3, 120-4, any other number, types, combinations, arrangements, and/or orientations of tethers 120 may be included in each aerial vehicle 110. For example, each aerial vehicle 110 may include one or more tethers 120 of various types to connect to the payload 130.

The payload 130 may include one or more connections 140, fixed or releasable, by which one or more tethers 120 may connect to the payload 130. In addition, the payload 130 may have any shape, and may be aerodynamically shaped, e.g., an airfoil shape. Further, the payload 130 may include a fixed wing or be shaped as a wing to facilitate horizontal flight and potentially generate lift during horizontal flight. Moreover, the payload 130 may comprise a container within which an object, item, or product may be held during transport by the aerial vehicle configuration 100, and the container may be actuated to open and release the object, item, or product at the appropriate time and location.

Although FIG. 1 shows a payload 130 having nine connections 140-1, 140-2, 140-3, 140-4, 140-5, 140-6, 140-7, 140-8, 140-9 by which tethers 120 of respective aerial vehicles 110 may connect to the payload 130, any other number, types, combinations, positions, arrangements, and/or orientations of connections 140 may be included on the payload 130. For example, one or more connections 140 of various types may be located on various surfaces, edges, or other portions of the payload 130.

Figure 2:
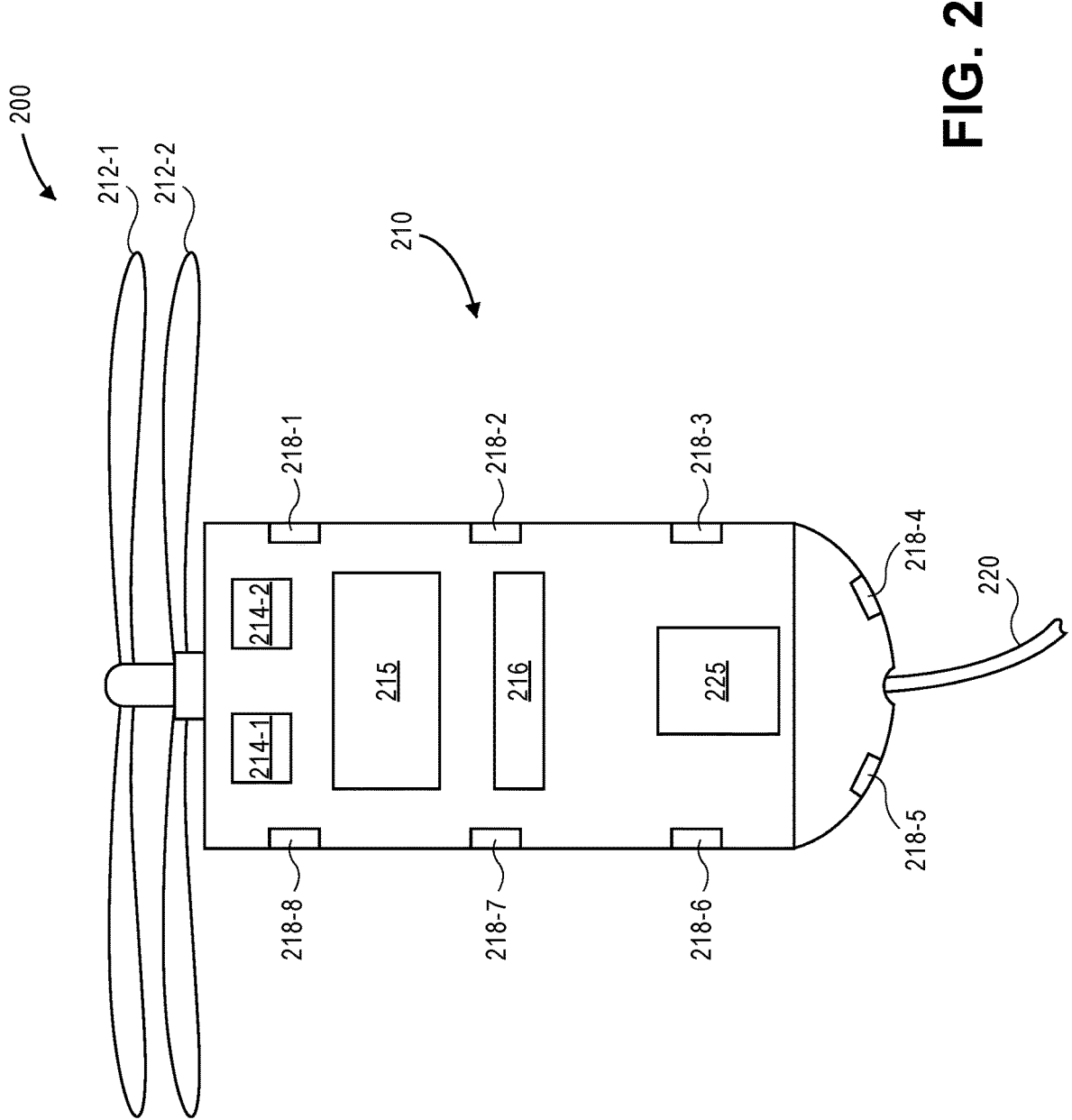
FIG. 2 is a schematic diagram of an example aerial vehicle, according to an implementation.

FIG. 2 is a schematic diagram 200 of an example aerial vehicle 210, according to an implementation.

The aerial vehicle 210 may include two stacked, counter-rotating propellers 212-1, 212-2 that are each operatively connected to a respective motor 214-1, 214-2. The propellers 212 and motors 214 may generate thrust and/or lift to enable the aerial vehicle 210 to aerially navigate, with or without a payload. Although FIG. 2 shows two propellers 212 and two motors 214 that generate thrust and/or lift, any other number, types, combinations, arrangements, and/or orientations of propulsion mechanisms, such as fans, jets, turbojets, turbo fans, jet engines, electric jets, or others, may also be used by any of the aerial vehicles connected to an aerial vehicle configuration, as described herein.

Figure 9:
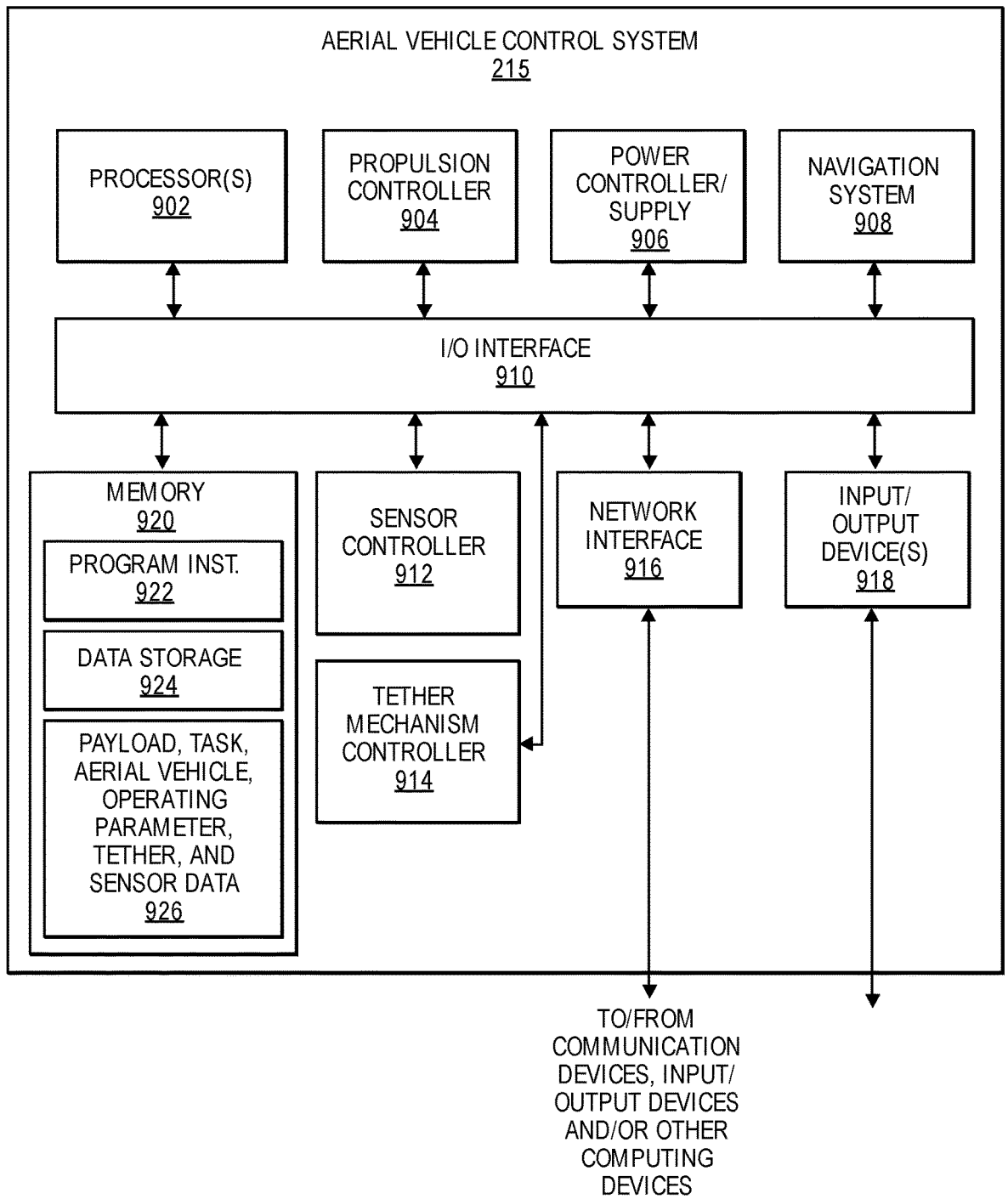
FIG. 9 is a block diagram illustrating various components of an aerial vehicle control system, according to an implementation.

In addition, the aerial vehicle 210 may also include a controller 215, as further described herein with respect to FIG. 9. The controller 215 may control the operation of the various components of the aerial vehicle 210, including navigation, operation of a tether 220 and/or a tether mechanism 225, attachment to or release from a payload, and other operations, when the aerial vehicle 210 is operating independently, as well as when the aerial vehicle 210 is operating cooperatively with other aerial vehicles connected to a payload together in an aerial vehicle configuration. Moreover, the controller 215 may control operations of the aerial vehicle 210 based at least in part on data received, sensed, and/or detected by the sensors 218.

Further, the aerial vehicle 210 may also include one or more power supplies 216. The power supplies 216 may provide power to various components of the aerial vehicle 210, including the motors 214 and propellers 212, the controller 215, the sensors 218, the tether mechanism 225, and other components. For example, the power supplies 216 may comprise batteries having electrochemical cells of various types, such as lithium ion (Li-ion, LiPo, LIP, Li-poly or others), nickel metal hydride (NiMH), or other cell types.

The aerial vehicle 210 may also include one or more sensors 218 of various types. For example, the sensors 218 may include image capture devices or sensors, time-of-flight sensors, radar sensors, LIDAR sensors, or other types of sensors. In addition, the image capture devices or sensors may operate within any wavelength or frequency of light. Although FIG. 2 shows eight sensors 218-1, 218-2, 218-3, 218-4, 218-5, 218-6, 218-7, 218-8 positioned at particular locations on the aerial vehicle 210, any other number, types, arrangements, combinations, and/or orientations of the sensors 218 are possible as described herein. For example, each aerial vehicle 210 may include three time-of-flight sensors to sense or detect other aerial vehicles in an aerial vehicle configuration and/or a payload.

Based at least in part on data received, sensed, and/or detected by the sensors 218, the controller 215 may control operations of the aerial vehicle 210, including navigation, operation of a tether 220 and/or a tether mechanism 225, attachment to or release from a payload, and other operations, when the aerial vehicle 210 is operating independently, as well as when the aerial vehicle 210 is operating cooperatively with other aerial vehicles connected to a payload together in an aerial vehicle configuration. For example, when the aerial vehicle 210 is operating cooperatively with other aerial vehicles in an aerial vehicle configuration, each aerial vehicle may receive, sense, and/or detect aspects of one or more other aerial vehicles in the aerial vehicle configuration and/or the payload, and the aerial vehicles may collectively control their respective operations to form and/or maintain relative positions, altitudes, and/or orientations with respect to the other aerial vehicles and/or the payload in the aerial vehicle configuration.

In addition, the aerial vehicle 210 may also include other sensors 218, such as inertial measurement units, gyroscopes, accelerometers, altimeters, global positioning system (GPS) sensors, or other location or position sensors, the data from which may also be used by the controller 215 to control the operations of the aerial vehicle 210, such as navigation, as well as forming and/or maintaining relative positions, altitudes, and/or orientations with respect to the other aerial vehicles in an aerial vehicle configuration and/or the payload.

Further, the aerial vehicle 210 may also include a tether 220. For example, the tether 220 may be a cable, wire, rod, tube, pipe, or other connecting element. In some embodiments, the tether 220 may be flexible, and in other embodiments, the tether 220 may be rigid. In further embodiments, the tether 220 may have any of various degrees or levels of flexibility between a relatively flexible string or cable and a relatively stiff beam or rod. In addition, the tether 220 may be made of various materials, such as plastics, metals, wires, composites, other materials, or combinations thereof. Further, in some embodiments, the tether 220 may include piezoelectric elements or components in order to selectively alter a stiffness or flexibility of portions of the tether 220. For example, a piezoelectric element may be actuated, e.g., by applying an electric current, in order to increase a stiffness of one or more portions of the tether 220. Although FIG. 2 shows a single tether 220 connected to and/or extending from a lower portion of the aerial vehicle 210, any other number, arrangements, combinations, and/or orientations of the tether 220 are possible as described herein.

Moreover, the tether 220 may have a defined length or a variable length. For example, in some embodiments, in order to provide a variable length, the aerial vehicle 210 may also include a tether mechanism 225 that may extend or retract a flexible tether 220, e.g., by winding or unwinding the tether 220 via an actuatable spool, reel, bobbin, or similar device. In other embodiments, in order to provide a variable length, the tether mechanism 225 may telescope sections of a rigid or flexible tether 220, e.g., by actuating one or more telescoping sections of the tether 220. The tether mechanism 225 may include one or more actuators to extend or retract the tether 220, including motors, servos, solenoids, rotary actuators, linear actuators, screw actuators, rack and pinion actuators, pneumatic actuators, hydraulic actuators, or other actuators.

In addition, the tether 220 may have a fixed connection or a releasable connection to the aerial vehicle 210 and/or a payload. For example, the tether 220 may have a fixed or releasable connection to a portion of the aerial vehicle 210, a portion of the tether mechanism 225, and/or a payload. In some embodiments, the fixed connections may include fasteners, adhesives, ball and socket connections, or other fixed connections to the aerial vehicle 210, the tether mechanism 225, and/or a payload. In addition, the releasable connections may include key and keyhole connections, hook and ring connections, magnetic connections, suction connections, or other releasable connections to the aerial vehicle 210, the tether mechanism 225, and/or a payload.

For example, in some embodiments, in order to provide a magnetic releasable connection, the tether 220 and/or the tether mechanism 225 may include a permanent magnet, an electromagnet, or a magnetic surface to releasably attach the tether 220 to the aerial vehicle 210, the tether mechanism 225, and/or a payload. In other embodiments, in order to provide a suction-based releasable connection, the tether mechanism 225 may create at least a partial vacuum within a hollow interior of the tether 220, e.g., a rod, tube, or pipe, to releasably attach the tether 220 to the aerial vehicle 210, the tether mechanism 225, and/or a payload. The tether mechanism 225 may include one or more actuators to releasably attach the tether 220 via magnetism or suction, including electric current sources, pumps, motors, pneumatic actuators, hydraulic actuators, or other actuators.

In still further embodiments, the tether mechanism 225 may also include a knife, scissors, cutting element, heating element, or other element to cut, sever, or otherwise disconnect the tether 220 from the aerial vehicle 210, the tether mechanism 225, and/or a payload. The tether mechanism 225 may include one or more actuators to disconnect the tether 220, including motors, servos, solenoids, electric current sources, heat sources, rotary actuators, linear actuators, screw actuators, rack and pinion actuators, pneumatic actuators, hydraulic actuators, or other actuators.

Although FIG. 2 shows a particular type of aerial vehicle 210 having a particular number, arrangements, combinations, and/or orientations of components, any other types of aerial vehicle having various numbers, arrangements, combinations, and/or orientations of components may also be connected to and used as part of an aerial vehicle configuration, as described herein. For example, various types of aerial vehicles such as the aerial vehicle shown in FIG. 2, quadcopters, hexacopters, octocopters, or other types of aerial vehicles may be included in various combinations in an aerial vehicle configuration.

Figure 3:
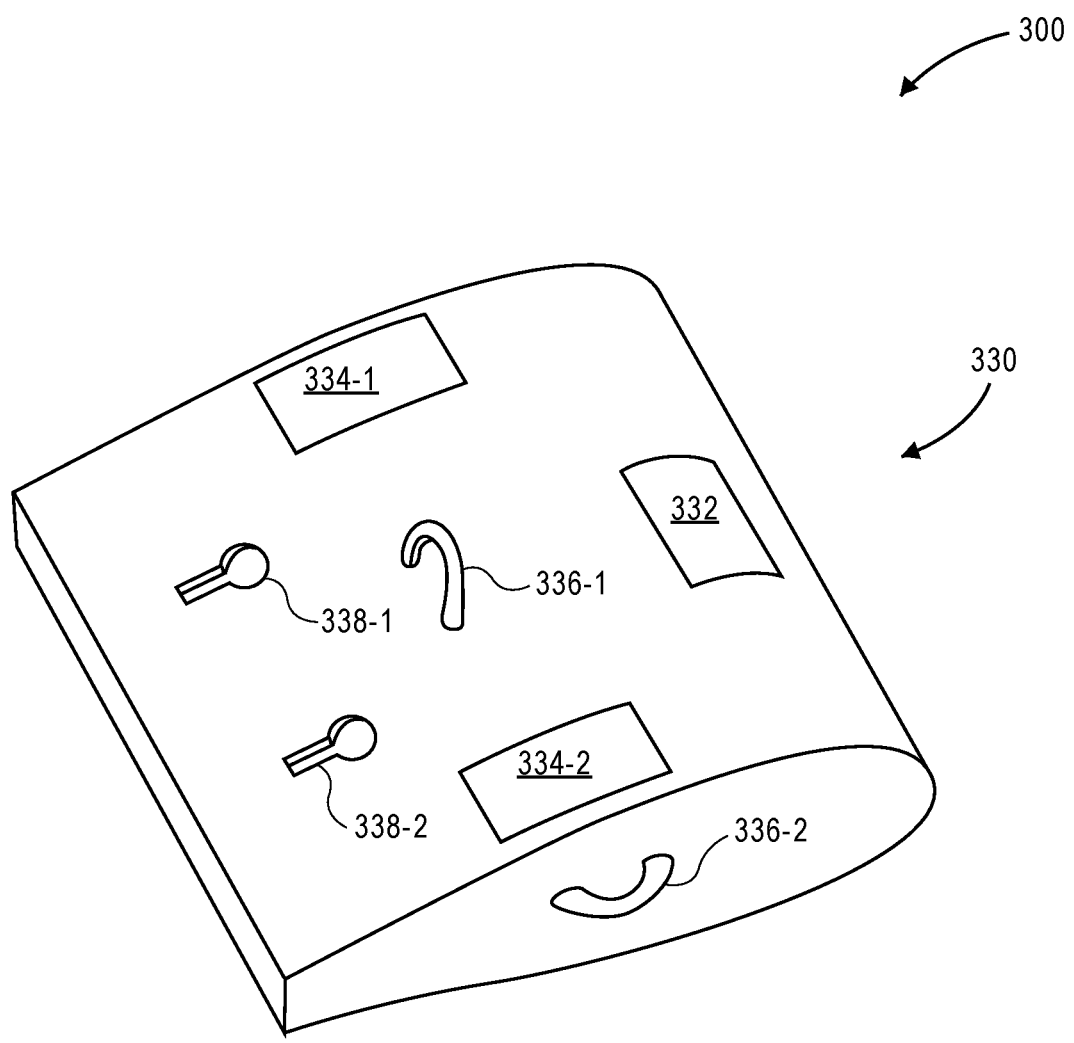
FIG. 3 is a schematic diagram of an example payload, according to an implementation.

FIG. 3 is a schematic diagram 300 of an example payload 330, according to an implementation.

The payload 330 may have any shape, including rectangular, circular, prismatic, polygonal, or any other shape. In addition, the payload 330 may be aerodynamically shaped, e.g., an airfoil shape. Further, the payload 330 may include a fixed wing or be shaped as a wing to facilitate horizontal flight and potentially generate lift during horizontal flight. Moreover, the payload 330 may comprise a container within which an object, item, or product may be held during transport by an aerial vehicle configuration, and the container may be actuated to open and release the object, item, or product at the appropriate time and location.

In addition, the payload 330 may include one or more connections 332, 334, 336, 338 to which one or more aerial vehicles may be connected via one or more tethers 220 to perform a task with respect to the payload 330, e.g., to transport the payload 330 to a location. The connections may be provided on any surface, edge, or other portion of the payload 330. Further, the connections may include fixed connections or releasable connections. For example, the fixed connections may include fasteners, adhesives, ball and socket connections, or other fixed connections. In addition, the releasable connections may include key and keyhole connections 338-1, 338-2, hook and ring connections 336-1, 336-2, magnetic connections 334-1, 334-2, suction connections 332, screwed or threaded connections, bayonet-type connections, or other releasable connections.

For example, the suction connections 332 may include a smooth, flat surface upon which a tether 220 connected to a tether mechanism 225 that provides at least a partial vacuum may connect via suction. In addition, the magnetic connections 334-1, 334-2 may include magnets, electromagnets, and/or magnetic surfaces or materials to which a tether 220 and/or a tether mechanism 225 that includes a permanent magnet, an electromagnet, and/or a magnetic surface may connect via magnetism.

Further, hook and ring connections 336-1, 336-2 may include at least a partial ring to which a tether 220 including a hook may connect. The hook may be an open hook, or may include a spring-loaded clasp to substantially close and secure the connection between the hook and ring. Alternatively, the tether 220 may instead include at least a partial ring, and the payload 330 may include a hook to connect to the ring.

In addition, key and keyhole connections 338-1, 338-2 may include a keyhole to which a tether 220 including a key may connect. The key may have a structure, e.g., a cylindrical, elliptical, or polygonal shaft with different diameter sections, that allows insertion or removal of the key within a larger dimension section of the keyhole, and that facilitates retention or grasping of the key within a smaller dimension section of the keyhole. Alternatively, the tether 220 may instead include a keyhole, and the payload 330 may include a key to connect to the keyhole.

Although FIG. 3 shows particular types of connections 332, 334, 336, 338 positioned at particular locations on the payload 330, any other types, numbers, arrangements, combinations, and/or orientations of the connections, including both fixed and releasable connections, are possible as described herein.

FIGS. 4A-4D are schematic diagrams of example reconfigurable aerial vehicle configurations 400A-400D, according to an implementation. FIGS. 4A-4D show example overhead views of aerial vehicle configurations 400A-400D that illustrate various radial positions and/or angular positions of each aerial vehicle relative to other aerial vehicles in an aerial vehicle configuration and/or a payload. Although not illustrated in the example overhead views of FIGS. 4A-4D, each of the aerial vehicles in the aerial vehicle configurations 400A-400D may also have various altitudes and/or orientations relative to other aerial vehicles in an aerial vehicle configuration and/or a payload.

Figure 4B:
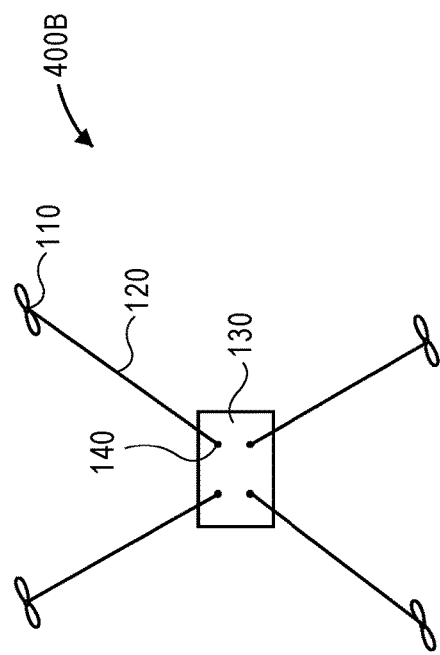
FIGS. 4A-4D are schematic diagrams of example reconfigurable aerial vehicle configurations, according to an implementation.
Figure 4D:
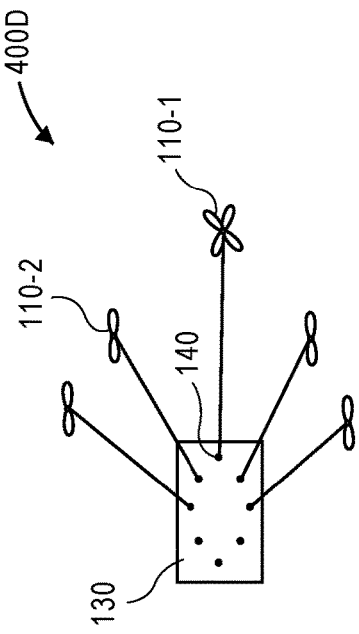
Figure 4A:
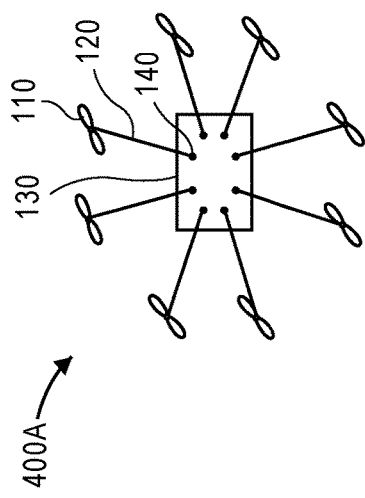

FIG. 4A shows a first example aerial vehicle configuration 400A in which eight aerial vehicles 110 are connected to connections 140 of a payload 130 via respective tethers 120. As shown, the eight aerial vehicles 110 may collectively operate similar to an octocopter, with radial positions that are substantially equal from a center of the aerial vehicle configuration 400A and with angular positions that are substantially evenly spaced around the periphery of the aerial vehicle configuration 400A. Various other arrangements and/or combinations of radial positions and/or angular positions may also be possible.

FIG. 4B shows a second example aerial vehicle configuration 400B in which four aerial vehicles 110 are connected to connections 140 of a payload 130 via respective tethers 120. As shown, the four aerial vehicles 110 may collectively operate similar to a quadcopter, with radial positions that are substantially equal from a center of the aerial vehicle configuration 400B and with angular positions that are substantially evenly spaced around the periphery of the aerial vehicle configuration 400B. For example, the radial positions of the aerial vehicles in FIG. 4B may be farther from a center of the aerial vehicle configuration 400B than the radial positions of the aerial vehicles in FIG. 4A with respect to the center of the aerial vehicle configuration 400A. In addition, the angular positions of the aerial vehicles in FIG. 4B may be different from the angular positions of the aerial vehicles in FIG. 4A. Various other arrangements and/or combinations of radial positions and/or angular positions may also be possible.

Figure 4C:
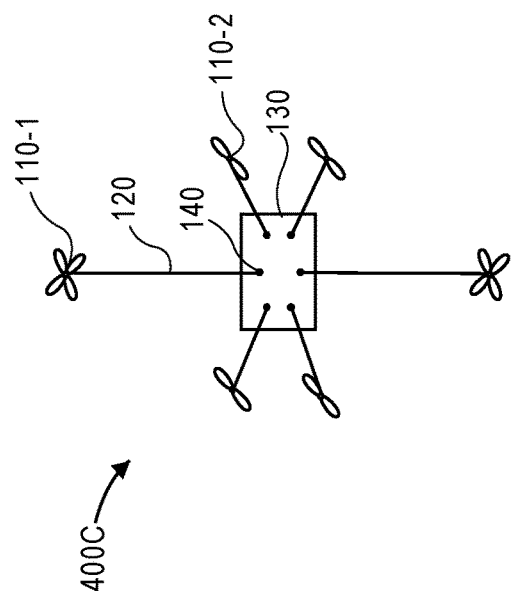

FIG. 4C shows a third example aerial vehicle configuration 400C in which six aerial vehicles 110 are connected to connections 140 of a payload 130 via respective tethers 120. As shown, the six aerial vehicles 110 may collectively operate similar to a hexacopter, with radial positions of two aerial vehicles 110-1 that are substantially equal from a center of the aerial vehicle configuration 400C and radial positions of four aerial vehicles 110-2 that are also substantially equal from the center of the aerial vehicle configuration 400C and closer than the radial positions of the two aerial vehicles 110-1, and with angular positions that are substantially evenly spaced around the periphery of the aerial vehicle configuration 400C. For example, the radial positions of the aerial vehicles 110-1 in FIG. 4C may be farther from a center of the aerial vehicle configuration 400C than the radial positions of the aerial vehicles in FIG. 4A with respect to the center of the aerial vehicle configuration 400A, whereas the radial positions of the aerial vehicles 110-2 in FIG. 4C may be closer to the center of the aerial vehicle configuration 400C than the radial positions of the aerial vehicles in FIG. 4A with respect to the center of the aerial vehicle configuration 400A. In addition, the angular positions of the aerial vehicles in FIG. 4C may be different from the angular positions of the aerial vehicles in FIG. 4A. Further, the aerial vehicles 110-1 may comprise a different type of aerial vehicle than aerial vehicles 110-2. Various other arrangements and/or combinations of radial positions and/or angular positions may also be possible.

FIG. 4D shows a fourth example aerial vehicle configuration 400D in which five aerial vehicles 110 are connected to connections 140 of a payload 130 via respective tethers 120. As shown, whereas the aerial vehicle configurations 400A-400C shown in FIGS. 4A-4C may collectively operate as both vertical takeoff and landing (VTOL) and horizontal flight configurations, the five aerial vehicles 110 shown in FIG. 4D in aerial vehicle configuration 400D may collectively operate primarily as a horizontal flight configuration, with radial positions and angular positions of the five aerial vehicles 110-1, 110-2 that simulate a flying jet, aircraft, or bird, or a formation of flying jets, aircraft, or birds. For example, the radial positions of the aerial vehicles 110-1, 110-2 in FIG. 4D may be determined in order to form the aerial vehicle configuration 400D. In addition, the angular positions of the aerial vehicles 110-1, 110-2 in FIG. 4D may also be determined in order to form the aerial vehicle configuration 400D. Further, the aerial vehicle 110-1 may comprise a different type of aerial vehicle than aerial vehicles 110-2. Various other arrangements and/or combinations of radial positions and/or angular positions may also be possible.

As described herein, although FIGS. 4A-4D show particular types, numbers, arrangements, combinations, and/or orientations of aerial vehicles, as well as one tether 120 for each aerial vehicle 110 and one connection 140 for each tether 120, any other types, numbers, arrangements, combinations, and/or orientations of the aerial vehicles 110 may be possible in the aerial vehicle configurations 400A-400D, as well as various other possible aerial vehicle configurations.

FIGS. 5A-5D are schematic diagrams of further example reconfigurable aerial vehicle configurations 500A-500D, according to an implementation. FIGS. 5A-5D show example side views of the aerial vehicle configurations 500A-500D that illustrate various radial positions, angular positions, altitudes, and/or orientations of each aerial vehicle relative to other aerial vehicles in an aerial vehicle configuration and/or a payload. Although not illustrated in the example side views of FIGS. 5A-5D, each of the aerial vehicles in the aerial vehicle configurations 500A-500D may also have various radial positions and/or angular positions relative to other aerial vehicles in an aerial vehicle configuration and/or a payload as described with respect to FIGS. 4A-4D.

Figure 5B:
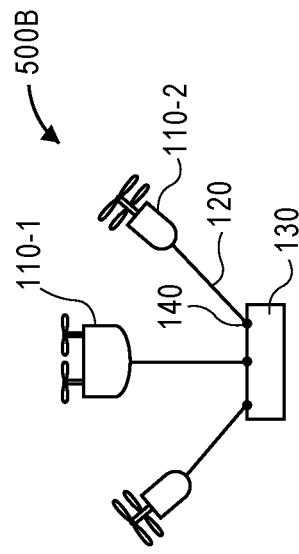
FIGS. 5A-5D are schematic diagrams of further example reconfigurable aerial vehicle configurations, according to an implementation.
Figure 5D:
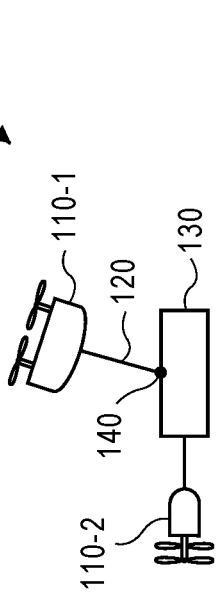
Figure 5A:
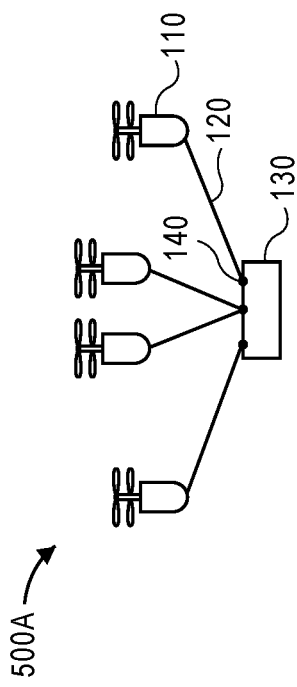

FIG. 5A shows a fifth example aerial vehicle configuration 500A in which four aerial vehicles 110 are connected to connections 140 of a payload 130 via respective tethers 120. As shown, the four aerial vehicles 110 may collectively operate similar to a quadcopter, with various radial positions, angular positions, altitudes, and/or orientations of the aerial vehicles. For example, the two aerial vehicles 110 that are closer to a center of the aerial vehicle configuration may have similar radial positions and/or altitudes as part of the aerial vehicle configuration 500A, and the two aerial vehicles 110 that are farther from a center of the aerial vehicle configuration may have similar radial positions and/or altitudes as part of the aerial vehicle configuration 500A. Various other arrangements and/or combinations of radial positions, angular positions, altitudes, and/or orientations may also be possible.

FIG. 5B shows a sixth example aerial vehicle configuration 500B in which three aerial vehicles 110 are connected to connections 140 of a payload 130 via respective tethers 120. As shown, the three aerial vehicles 110 may collectively operate similar to a tricopter, with various radial positions, angular positions, altitudes, and/or orientations of the aerial vehicles. For example, one aerial vehicle 110-1 may be substantially over a center of the aerial vehicle configuration and/or the payload, and the two aerial vehicles 110-2 that are farther from a center of the aerial vehicle configuration may have similar radial positions and/or altitudes as part of the aerial vehicle configuration 500B. In addition, the two aerial vehicles 110-2 may be oriented, e.g., canted, at different angles with respect to the aerial vehicle 110-1 of the aerial vehicle configuration. Further, the aerial vehicle 110-1 may comprise a different type of aerial vehicle than aerial vehicles 110-2. Various other arrangements and/or combinations of radial positions, angular positions, altitudes, and/or orientations may also be possible.

Figure 5C:
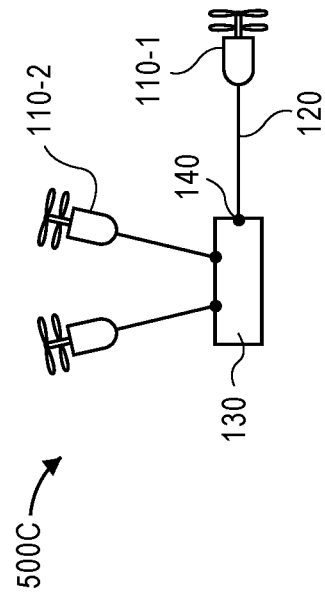

FIG. 5C shows a seventh example aerial vehicle configuration 500C in which three aerial vehicles 110 are connected to connections 140 of a payload 130 via respective tethers 120. As shown, whereas the aerial vehicle configurations 500A, 500B shown in FIGS. 5A, 5B may collectively operate as both vertical takeoff and landing (VTOL) and horizontal flight configurations, the three aerial vehicles 110 shown in FIG. 5C in aerial vehicle configuration 500C may collectively operate primarily as a horizontal flight configuration, with radial positions, angular positions, altitudes, and/or orientations of the three aerial vehicles 110-1, 110-2 that facilitate horizontal flight. For example, the aerial vehicle 110-1 may operate primarily as a pulling aerial vehicle to pull the payload 130, and the aerial vehicles 110-2 may operate primarily as lifting aerial vehicles to maintain an altitude of the payload 130. For example, the radial positions, angular positions, altitudes, and/or orientations of the aerial vehicles 110-1, 110-2 in FIG. 5C may be determined in order to form the aerial vehicle configuration 500C. In other embodiments, if the payload includes a fixed wing or is shaped as a wing, the aerial vehicle configuration may include only one or more aerial vehicles that pull the payload, as the shape of the payload may itself generate sufficient lift to maintain an altitude, e.g., other lifting aerial vehicles may disconnect from the payload after the aerial vehicle configuration has transitioned to horizontal flight. Various other arrangements and/or combinations of radial positions, angular positions, altitudes, and/or orientations may also be possible.

FIG. 5D shows an eighth example aerial vehicle configuration 500D in which two aerial vehicles 110 are connected to connections 140 of a payload 130 via respective tethers 120. As shown, whereas the aerial vehicle configurations 500A, 500B shown in FIGS. 5A, 5B may collectively operate as both vertical takeoff and landing (VTOL) and horizontal flight configurations, the two aerial vehicles 110 shown in FIG. 5D in aerial vehicle configuration 500D may collectively operate primarily as a horizontal flight configuration, with radial positions, angular positions, altitudes, and/or orientations of the two aerial vehicles 110-1, 110-2 that facilitate horizontal flight. For example, the aerial vehicle 110-2 may operate primarily as a pushing aerial vehicle to push the payload 130, and the aerial vehicle 110-1 may operate primarily as a lifting aerial vehicle to maintain an altitude of the payload 130. For example, the radial positions, angular positions, altitudes, and/or orientations of the aerial vehicles 110-1, 110-2 in FIG. 5D may be determined in order to form the aerial vehicle configuration 500D, and the tether between the pushing aerial vehicle 110-2 and the payload 130 may be substantially rigid, e.g., a rod, tube, or pipe, in order to be able to impart a pushing force on the payload. In other embodiments, if the payload includes a fixed wing or is shaped as a wing, the aerial vehicle configuration may include only one or more aerial vehicles that push the payload, as the shape of the payload may itself generate sufficient lift to maintain an altitude, e.g., other lifting aerial vehicles may disconnect from the payload after the aerial vehicle configuration has transitioned to horizontal flight. Various other arrangements and/or combinations of radial positions, angular positions, altitudes, and/or orientations may also be possible.

As described herein, although FIGS. 5A-5D show particular types, numbers, arrangements, combinations, and/or orientations of aerial vehicles, as well as one tether 120 for each aerial vehicle 110 and primarily one connection 140 for each tether 120, any other types, numbers, arrangements, combinations, and/or orientations of the aerial vehicles 110 may be possible in the aerial vehicle configurations 500A-500D, as well as various other possible aerial vehicle configurations. In addition, any aspects of the example aerial vehicle configurations shown and described with respect to FIGS. 4A-5D may be combined in various combinations.

Example aerial vehicle configurations may be determined based at least in part on one or more of information associated with a payload, information associated with a task to be completed with respect to the payload, and/or information associated with various aerial vehicles. The information associated with a payload may include various aspects associated with a payload as described herein. The information associated with a task may include various aspects associated with a flight plan, the task, an environment, or various other conditions described herein. The information associated with various aerial vehicles may include various aspects associated with aerial vehicles or aerial vehicle configurations as described herein.

Furthermore, during operation of an example aerial vehicle configuration, the aerial vehicle configuration may be modified based at least in part on one or more operating parameters, or changes in one or more operating parameters. For example, the operating parameters may also include aspects related to an aerial vehicle, an aerial vehicle configuration, a payload, a flight plan, a task, an environment, or various other conditions or aspects.

Aspects related to an aerial vehicle may include operating status, power, range, efficiency, weight, type, dimensions, identifiers, tethers, tether mechanisms, or other aspects. For example, an aerial vehicle configuration may be determined based on desired power, range, efficiency, weight, dimensions, and/or type of the aerial vehicles, as well as the type of tethers and/or tether mechanisms of the aerial vehicles. During operation, if an aerial vehicle in an aerial vehicle configuration has malfunctioned or is not functioning as desired, or if an aerial vehicle in an aerial vehicle configuration does not have the required power or range to complete the task as part of the aerial vehicle configuration, the aerial vehicle may disconnect from the aerial vehicle configuration. Alternatively or in addition, a malfunctioning or suboptimally functioning aerial vehicle may remain connected to the aerial vehicle configuration and be towed or carried by a remainder of the aerial vehicles in the aerial vehicle configuration. Moreover, if an aerial vehicle in an aerial vehicle configuration does not have a desired tether or tether mechanism to complete a portion of the task, the aerial vehicle may not be used as part of the aerial vehicle configuration during the portion of the task. Further, various other modifications to the aerial vehicle configuration may be made, including changing positions, altitudes, and/or orientations of aerial vehicles, disconnecting aerial vehicles, connecting new aerial vehicles, or other modifications.

Aspects related to an aerial vehicle configuration may include operating status, power, range, efficiency, weight, dimensions, identifiers, tethers, tether mechanisms, type of aerial vehicles, number of aerial vehicles, combination of aerial vehicles, arrangement of aerial vehicles, orientations of aerial vehicles, or other aspects. For example, an aerial vehicle configuration may be determined based on desired power, range, efficiency, dimensions, and/or weight of the aerial vehicle configuration as a whole, as well as the types of tethers and/or tether mechanisms of the aerial vehicles. In addition, the aerial vehicle configuration may be determined based on desired type, number, combination, arrangement, and/or orientation of the aerial vehicles. During operation, if an aerial vehicle configuration as a whole has malfunctioned or is not functioning as desired, or if an aerial vehicle configuration does not have the required power or range to complete the task, one or more aerial vehicles may also disconnect from or connect to the aerial vehicle configuration. Alternatively or in addition, a malfunctioning or suboptimally functioning aerial vehicle configuration may maintain one or more aerial vehicles connected to the aerial vehicle configuration that may be towed or carried by a remainder of the aerial vehicles in the aerial vehicle configuration. Further, various other modifications to the aerial vehicle configuration may be made, including changing positions, altitudes, and/or orientations of aerial vehicles, disconnecting aerial vehicles, connecting new aerial vehicles, or other modifications.

Aspects related to a payload may include weight, size, shape, type of connections, number of connections, combination of connections, arrangement of connections, orientations of connections, or other aspects. For example, an aerial vehicle configuration may be determined based on weight, size, and/or shape of the payload, as well as the types of connections and/or other aspects associated with the connections of the payload. During operation, if a payload includes a fixed wing or is shaped as a wing, the aerial vehicle configuration may be modified to one or more horizontal flight configurations that takes advantage of the payload shape that may generate lift. In addition, if a payload includes various connections around its periphery, one or more of the connections may be used by different aerial vehicles during different portions of the task associated with the payload. Further, various other modifications to the aerial vehicle configuration may be made, including changing positions, altitudes, and/or orientations of aerial vehicles, disconnecting aerial vehicles, connecting new aerial vehicles, or other modifications.

Aspects related to a flight plan or task associated with a payload may include vertical takeoff and landing (VTOL) operations, horizontal flight operations, hover operations, speed, altitude, distance, heading, or other aspects. For example, an aerial vehicle configuration may be determined based on expected operations and portions of the flight plan or task. During operation, if a flight plan or task includes VTOL operations or horizontal flight operations, the aerial vehicle configuration may be modified to one or more VTOL flight configurations or horizontal flight configurations, as appropriate, during such portions of the flight plan, which may include changing positions, altitudes, and/or orientations of aerial vehicles, disconnecting aerial vehicles, connecting new aerial vehicles, or other modifications. In addition, if a flight plan or task includes high speed or high altitude operations, the aerial vehicle configuration may be modified to one or more high speed flight configurations or high altitude flight configurations, as appropriate, during such portions of the flight plan, which may include changing positions, altitudes, and/or orientations of aerial vehicles, disconnecting aerial vehicles, connecting new aerial vehicles, or other modifications. Further, various other modifications to the aerial vehicle configuration may be made, including changing positions, altitudes, and/or orientations of aerial vehicles, disconnecting aerial vehicles, connecting new aerial vehicles, or other modifications.

Aspects related to an environment associated with a flight plan or task may include weather, temperature, pressure, humidity, wind, precipitation, natural obstacles, manmade obstacles, vehicles, persons, or objects in proximity, urban areas, rural areas, or other aspects. For example, an aerial vehicle configuration may be determined based on expected temperatures or weather associated with the flight plan or task, as well as based on expected obstacles or proximity to vehicles, persons, or other objects during the flight plan or task. During operation, if an environment includes high wind, high or low temperatures, precipitation, or other weather-related aspects, the aerial vehicle configuration may be modified to one or more configurations to withstand such conditions, which may include changing positions, altitudes, and/or orientations of aerial vehicles, disconnecting aerial vehicles, connecting new aerial vehicles, or other modifications. In addition, if an environment includes an urban area or various vehicles, persons, or objects in proximity, the aerial vehicle configuration may be modified to one or more configurations to maintain safe, controlled, and/or agile operations, which may include changing positions, altitudes, and/or orientations of aerial vehicles, disconnecting aerial vehicles, connecting new aerial vehicles, or other modifications. Further, various other modifications to the aerial vehicle configuration may be made, including changing positions, altitudes, and/or orientations of aerial vehicles, disconnecting aerial vehicles, connecting new aerial vehicles, or other modifications.

In some embodiments, a particular type, number, arrangement, combination, and/or orientation of aerial vehicles may be determined for an aerial vehicle configuration for VTOL operations. If the aerial vehicle configuration transitions to horizontal flight operations, the aerial vehicle configuration may be modified to have a different type, number, arrangement, combination, and/or orientation of aerial vehicles. Further, if the aerial vehicle configuration then transitions back to VTOL operations, the aerial vehicle configuration may be further modified to have yet another different type, number, arrangement, combination, and/or orientation of aerial vehicles. In this context, various aerial vehicles may be present and/or available at locations associated with VTOL operations, such as warehouses, facilities, distribution centers, pickup and/or dropoff locations, waypoints, urban areas, or any other locations at which VTOL operations may frequently occur, to facilitate transitions of aerial vehicle configurations to and from VTOL operations.

In addition, in some embodiments, an aerial vehicle configuration including a greater number of connected aerial vehicles may exhibit more stability, whereas an aerial vehicle configuration including a fewer number of connected aerial vehicles may exhibit more agility. Further, in some embodiments, an aerial vehicle configuration including connected aerial vehicles at larger radial positions may exhibit more stability, whereas an aerial vehicle configuration including connected aerial vehicles at smaller radial positions may exhibit more agility. Moreover, in some embodiments, an aerial vehicle configuration may include connected aerial vehicles at larger radial positions responsive to operations at high altitudes, at high speeds, and/or in relatively open and/or uncongested areas, whereas an aerial vehicle configuration may include connected aerial vehicles at smaller radial positions responsive to operations at low altitudes, at low speeds, near pickup or dropoff locations, and/or in relatively restricted and/or congested areas.

Moreover, in some embodiments, angular positions, radial positions, altitudes, and/or orientations of aerial vehicles in an aerial vehicle configuration may be modified using tether mechanisms to extend, retract, telescope, or otherwise alter lengths of the tethers. In addition, in some embodiments, angular positions, radial positions, altitudes, and/or orientations of aerial vehicles in an aerial vehicle configuration may be modified by altering thrust generated by one or more of the aerial vehicles. Further, in some embodiments, modifications to radial positions, angular positions, altitudes, and/or orientations of aerial vehicles may be based at least in part on data received, detected, and/or sensed by one or more sensors of the aerial vehicles, such that the aerial vehicle configuration collectively forms and/or maintains relative positions, altitudes, and/or orientations of the aerial vehicles and/or the payload.

Further, in some embodiments, one or more aerial vehicles may automatically connect or disconnect to an aerial vehicle configuration using one or more releasable connections, such as magnetic or suction connections as described herein. In order to automatically connect to an aerial vehicle configuration, an aerial vehicle may navigate proximate the payload that may already be carried by other aerial vehicles, the aerial vehicle may detect, e.g., using imaging sensors or other time-of-flight sensors, a desired connection for its tether, and the aerial vehicle may operate its tether and/or tether mechanism to connect to the payload at the desired connection. The aerial vehicle and other aerial vehicles of the aerial vehicle configuration may also modify their positions, altitudes, and/or orientations responsive to the connection by the aerial vehicle. In order to automatically disconnect from an aerial vehicle configuration, an aerial vehicle may operate its tether and/or tether mechanism to disconnect from the payload, and the aerial vehicle and/or the remaining aerial vehicle configuration may navigate away from each other. The remaining aerial vehicles of the aerial vehicle configuration may also modify their positions, altitudes, and/or orientations responsive to the disconnection by the aerial vehicle.

Furthermore, in some embodiments, all aerial vehicles in an aerial vehicle configuration may include releasable connections to a payload. In such cases, if a payload is to be delivered to a location, all aerial vehicles may disconnect from the payload at the delivery location. One or more individual aerial vehicles may then operate independently and return to a warehouse, facility, waypoint, or other location to be used in another aerial vehicle configuration. Alternatively or in addition, one or more individual aerial vehicles may connect to different aerial vehicle configurations to facilitate completion of other tasks associated with different payloads.

Figure 6:
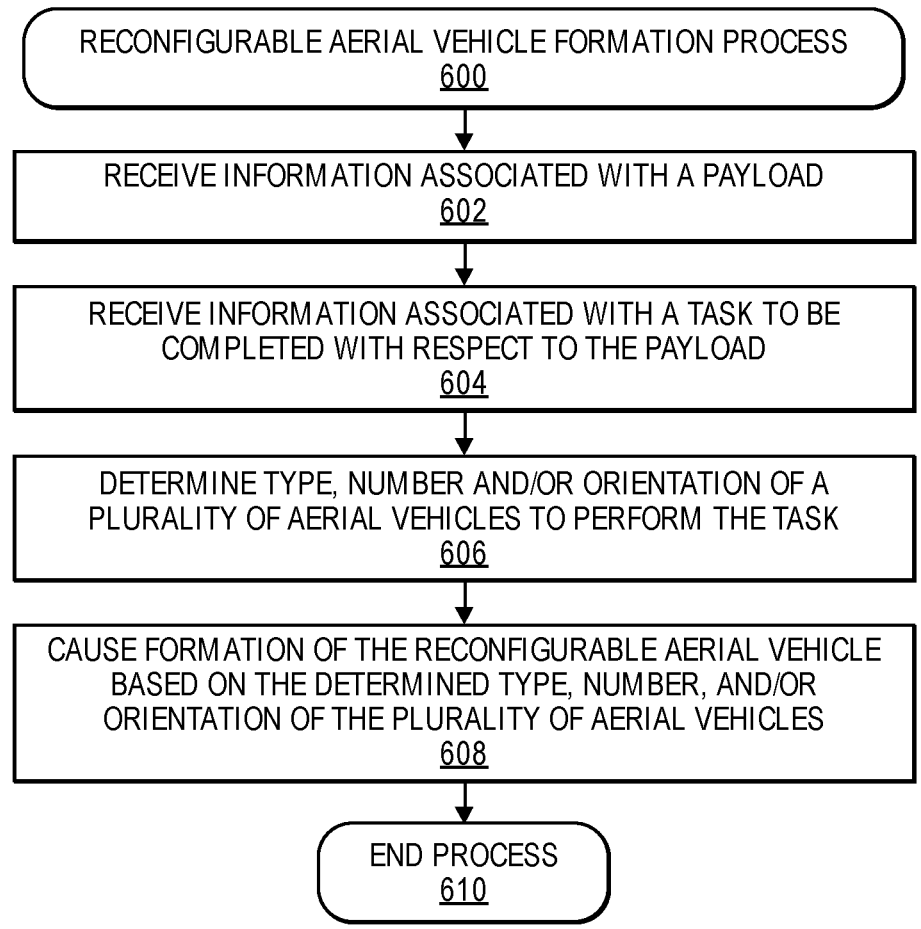
FIG. 6 is a flow diagram illustrating an example reconfigurable aerial vehicle formation process, according to an implementation.

FIG. 6 is a flow diagram illustrating an example reconfigurable aerial vehicle formation process 600, according to an implementation.

The process 600 may begin by receiving information associated with a payload, as at 602. For example, the information associated with a payload may include aspects of the payload, such as weight, size, shape, type of connections, number of connections, combination of connections, arrangement of connections, orientations of connections, or other aspects.

The process 600 may continue by receiving information associated with a task to be completed with respect to the payload, as at 604. For example, the task may include a delivery of the payload to a location, a pickup of the payload from a location, or any other task. Information associated with the task may include aspects of the task, such as vertical takeoff and landing (VTOL) operations, horizontal flight operations, hover operations, speed, altitude, distance, heading, or other aspects. Information associated with the task may also include aspects of an environment associated with the task, such as weather, temperature, pressure, humidity, wind, precipitation, natural obstacles, manmade obstacles, vehicles, persons, or objects in proximity, urban areas, rural areas, or other aspects.

The process 600 may then proceed to determine a type, number, arrangement, combination, and/or orientation of a plurality of aerial vehicles to perform the task, as at 606. For example, the type of aerial vehicles may include aerial vehicles with two stacked, counter-rotating propellers, quadcopters, hexacopters, or other types of aerial vehicles. The number of aerial vehicles may include two or more aerial vehicles. In some embodiments, only a single aerial vehicle may be used for one or more portions of a task or flight plan. Further, various arrangements, combinations, and/or orientations of a plurality of aerial vehicles, of potentially different types, may be determined for completion of the task. Moreover, the aerial vehicles may be selected for the task or flight plan based at least in part on aspects of the aerial vehicles and/or any aerial vehicle configuration including the aerial vehicles, such operating status, power, range, efficiency, weight, type, dimensions, identifiers, tethers, tether mechanisms, type of aerial vehicles, number of aerial vehicles, combination of aerial vehicles, arrangement of aerial vehicles, orientations of aerial vehicles, or other aspects. For example, an aerial vehicle may be selected for an aerial vehicle configuration based at least in part on characteristics of a tether, e.g., rigid, flexible, extendible, retractable, telescoping, fixed, and/or releasable, characteristics of a tether mechanism, e.g., extending, retracting, telescoping, magnetic attachment or release, or suction-based attachment or release, and/or other characteristics of the aerial vehicle.

The process 600 may then continue by causing formation of the reconfigurable aerial vehicle configuration based at least in part on the determined type, number, arrangement, combination, and/or orientation of the plurality of aerial vehicles, as at 608. For example, each aerial vehicle may connect to a payload as part of the aerial vehicle configuration via one or more tethers and releasable connections. In addition, one or more aerial vehicles may have fixed connections between one or more tethers and the payload. Further, one or more aerial vehicles may operate or adjust tether mechanisms to adjust tethers that have variable lengths. The aerial vehicle configuration may include any of the aerial vehicles described herein, which may be arranged, combined, and/or oriented in any of various possible configurations as described herein. The process 600 may then end, as at 610.

Figure 7:
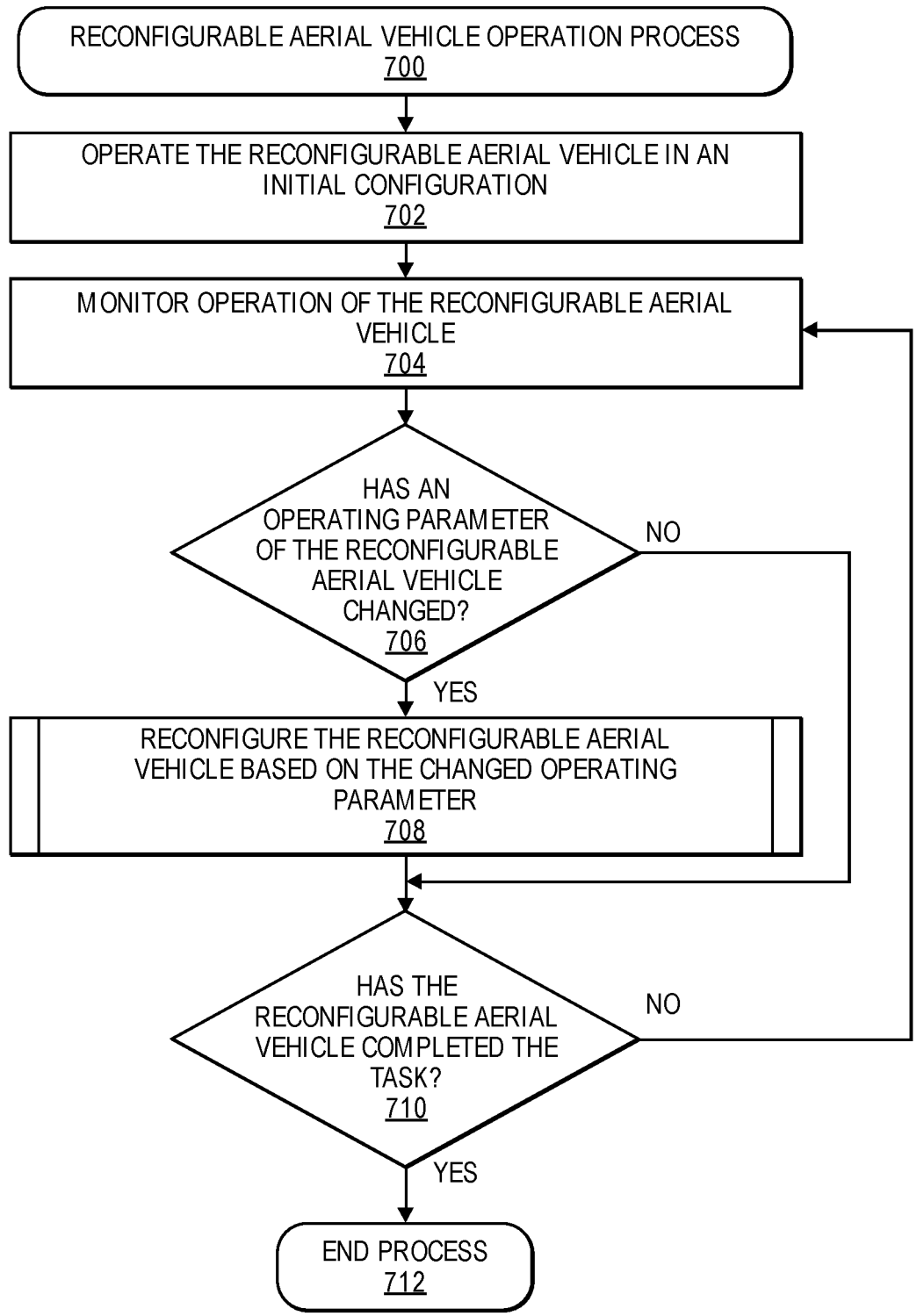
FIG. 7 is a flow diagram illustrating an example reconfigurable aerial vehicle operation process, according to an implementation.

FIG. 7 is a flow diagram illustrating an example reconfigurable aerial vehicle operation process 700, according to an implementation.

The process 700 may begin by operating the reconfigurable aerial vehicle configuration in an initial configuration, as at 702. For example, the initial configuration may include the type, number, arrangement, combination, and/or orientation of the plurality of aerial vehicles, as determined and formed at 606 and 608 of FIG. 6. The initial configuration may include particular radial positions, angular positions, altitudes, and/or orientations of the plurality of aerial vehicles with respect to each other and/or a payload. For example, one or more aerial vehicles may operate or adjust tether mechanisms to adjust tethers that have variable lengths, and/or one or more aerial vehicle may operate propellers and motors, or other propulsion mechanisms, to form a determined arrangement and/or orientation of the plurality of aerial vehicles. In addition, each of the one or more aerial vehicles may include one or more sensors to receive, detect, and/or sense aspects of other aerial vehicles in the aerial vehicle configuration and/or a payload, in order to collectively form and/or maintain relative positions, altitudes, and/or orientations of the aerial vehicles and/or the payload.

The process 700 may continue by monitoring an operation of the reconfigurable aerial vehicle configuration, as at 704. For example, various aspects may be monitored, such as individual aerial vehicles, the aerial vehicle configuration as a whole, the payload, the flight plan or task, the environment, and/or other conditions or aspects. The various aspects may be monitored for changes to any of various operating parameters or aspects associated individual aerial vehicles, the aerial vehicle configuration as a whole, the payload, the flight plan or task, the environment, and/or other conditions or aspects.

The process 700 may then proceed by determining whether any of the various operating parameters of the reconfigurable aerial vehicle configuration has changed, as at 706. If an operating parameter has changed, then the process 700 may continue by reconfiguring the reconfigurable aerial vehicle configuration based at least in part on the changed operating parameter, as at 708, which is described in further detail with respect to FIG. 8. For example, if an individual aerial vehicle is malfunctioning, one or more modifications may be made to the aerial vehicle configuration, including disconnecting the malfunctioning aerial vehicle, connecting a new aerial vehicle, and/or repositioning one or more aerial vehicles. In addition, if the aerial vehicle configuration as a whole is not operating as desired, one or more modifications may be made to the aerial vehicle configuration, including disconnecting an aerial vehicle, connecting a new aerial vehicle, and/or repositioning one or more aerial vehicles. Further, based at least in part on changes to the flight plan or task, or an environment associated with the flight plan or task, one or more modifications may be made to the aerial vehicle configuration, including disconnecting an aerial vehicle, connecting a new aerial vehicle, and/or repositioning one or more aerial vehicles.

If it is determined at 706 that an operating parameter has not changed, or after reconfiguring the reconfigurable aerial vehicle configuration based at least in part on the changed operating parameter at 708, the process 700 may continue by determining whether the reconfigurable aerial vehicle configuration has completed the task associated with the payload, as at 710. For example, the task may include a delivery of the payload to a location, a pickup of the payload from a location, or any other task. If the task has not been completed, then the process 700 may return to 704 and continue monitoring an operation of the reconfigurable aerial vehicle configuration. If the task has been completed, then the process may end, as at 712.

In some embodiments, for a task that includes a delivery of the payload to a location, all aerial vehicles may disconnect from the payload upon delivery to the location, and the individual aerial vehicles may return to warehouses, facilities, waypoints, or other locations to be used in other aerial vehicle configurations, or alternatively, one or more of the individual aerial vehicles may join other aerial vehicle configurations to perform other tasks associated with other payloads. In other embodiments, for a task that includes a delivery of the payload to a location and a return of a payload container to another location, one or more aerial vehicles may remain connected to the payload, e.g., if the payload is a payload container that includes an item, product, or object to be delivered to the location. The one or more remaining connected aerial vehicles may have fixed or releasable connections to the payload container. Then, the remaining connected aerial vehicles may form a modified aerial vehicle configuration that returns with the payload container to a warehouse, facility, waypoint, or other location to be used in other aerial vehicle configurations for other tasks. Alternatively, if a payload container is dropped off at a location and all aerial vehicles disconnect from the payload container, one or more other aerial vehicles may later form another aerial vehicle configuration to retrieve the payload container from the location and return the payload container to a warehouse, facility, waypoint, or other location to be used in other aerial vehicle configurations for other tasks.

Figure 8:
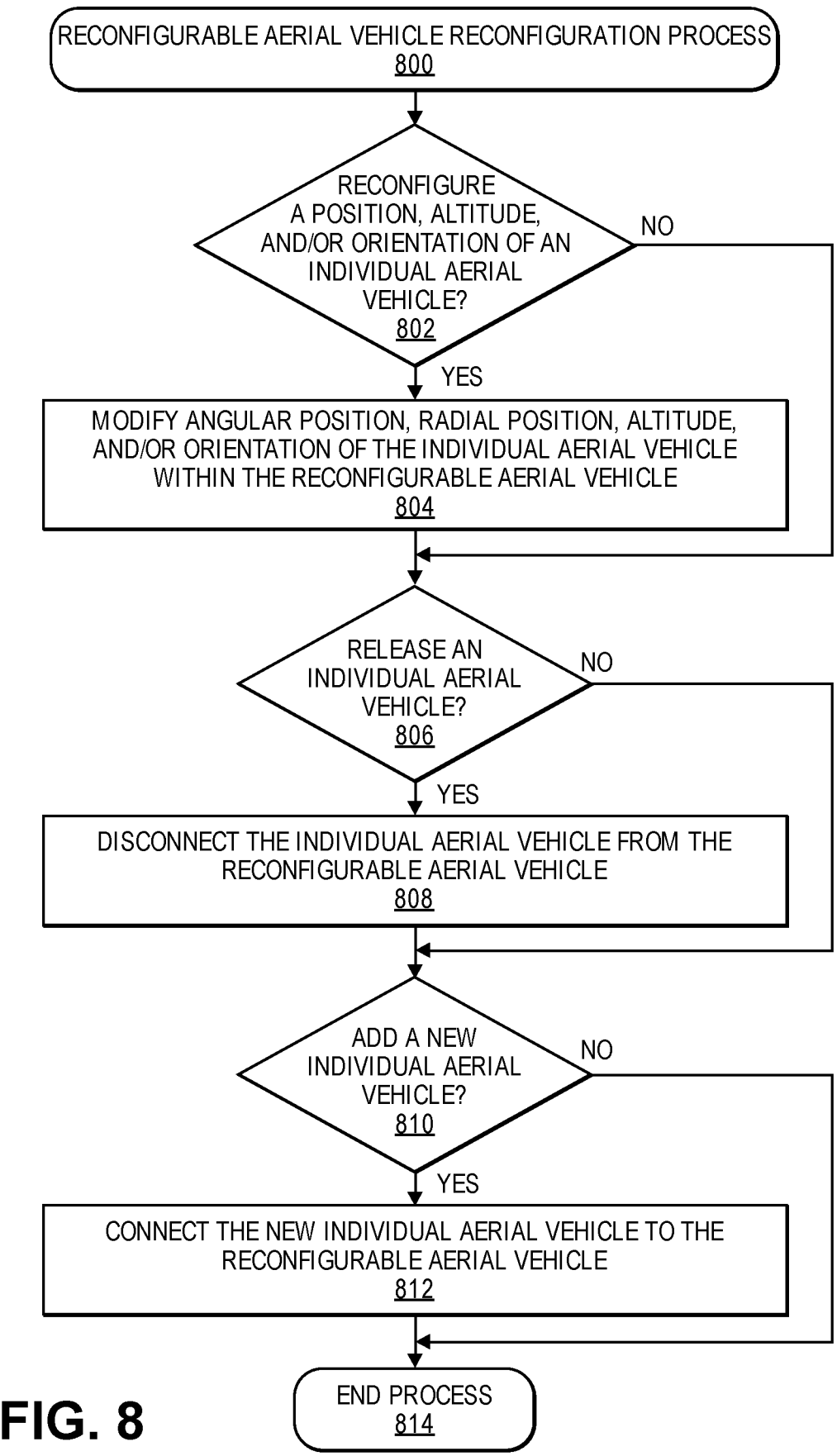
FIG. 8 is a flow diagram illustrating an example reconfigurable aerial vehicle reconfiguration process, according to an implementation.

FIG. 8 is a flow diagram illustrating an example reconfigurable aerial vehicle reconfiguration process 800, according to an implementation.

The process 800 may begin by determining whether an angular position, a radial position, an altitude, and/or an orientation of one or more aerial vehicles is to be reconfigured, as at 802, based at least in part on a changed operating parameter, as described at 704, 706 of FIG. 7. For example, the angular position of an aerial vehicle may relate to angular position around a center of the payload (e.g., from an overhead view), the radial position of an aerial vehicle may relate to a radial distance from a center of the payload (e.g., from an overhead view), the altitude of an aerial vehicle may relate to an absolute altitude or a relative altitude with respect to other aerial vehicles and/or the payload, and the orientation may relate to a cant angle or other orientation of an aerial vehicle at a particular angular position, radial position, and altitude relative other aerial vehicles and/or the payload.

If an angular position, a radial position, an altitude, and/or an orientation of one or more aerial vehicles is to be reconfigured, then the process 800 may continue by modifying an angular position, a radial position, an altitude, and/or an orientation of one or more aerial vehicles, as at 804. For example, if the changed operating parameter relates to a transition in a flight plan between VTOL operations to horizontal flight operations, one or more aerial vehicles may transition to a position, altitude, and/or orientation to pull or push the aerial vehicle configuration, whereas one or more other aerial vehicles may transition to a position, altitude, and/or orientation to maintain an altitude of the aerial vehicle configuration. In some embodiments, modifications to an angular position, a radial position, an altitude, and/or an orientation may be effected by operating a tether mechanism to extend, retract, telescope, or otherwise change a variable length of a tether. In other embodiments, modifications to an angular position, a radial position, an altitude, and/or an orientation may be effected by altering thrust generated by propellers and motors, or other propulsion mechanisms. In addition, each of the one or more aerial vehicles may include one or more sensors to receive, detect, and/or sense aspects of other aerial vehicles in the aerial vehicle configuration and/or a payload, in order to collectively form and/or maintain relative positions, altitudes, and/or orientations of the aerial vehicles and/or the payload.

If an angular position, a radial position, an altitude, and/or an orientation of one or more aerial vehicles is not to be reconfigured at 802, or after modifying an angular position, a radial position, an altitude, and/or an orientation of one or more aerial vehicles at 804, the process 800 may continue by determining whether one or more aerial vehicles is to be released or disconnected from the aerial vehicle configuration, as at 806. For example, an aerial vehicle may be disconnected from an aerial vehicle configuration via a fixed or releasable connection of a tether, and/or via a knife, scissors, cutting element, heating element, or other element to cut, sever, or otherwise disconnect the tether. Disconnection of a fixed connection may be effected by manual disconnection or disconnection with the one or more automated tools or machines, whereas disconnection of a releasable connection may be effected automatically by a controller and/or a tether mechanism of the aerial vehicle.

If one or more aerial vehicles is to be released or disconnected from the aerial vehicle configuration, then the process 800 may continue by disconnecting the one or more aerial vehicles from the aerial vehicle configuration, as at 808. For example, if the changed operating parameter relates to a transition in a flight plan between VTOL operations to horizontal flight operations, one or more aerial vehicles may no longer be needed for horizontal flight operations and thus disconnected from the aerial vehicle configuration. As another example, if the changed operating parameter relates to a malfunctioning aerial vehicle or an aerial vehicle with insufficient power or range, the malfunctioning or insufficient aerial vehicle may be disconnected from the aerial vehicle configuration. Further, if the changed operating parameter relates to a change in the environment, e.g., from high winds to low winds, one or more aerial vehicles may no longer be needed for safe and stable operation and thus disconnected from the aerial vehicle configuration. In addition, the remaining one or more aerial vehicles of the aerial vehicle configuration may include one or more sensors to receive, detect, and/or sense aspects of other aerial vehicles in the aerial vehicle configuration and/or a payload, in order to collectively form and/or maintain relative positions, altitudes, and/or orientations of the aerial vehicles and/or the payload.

If one or more aerial vehicles is not to be released or disconnected from the aerial vehicle configuration at 806, or after disconnecting the one or more aerial vehicles from the aerial vehicle configuration at 808, the process 800 may continue by determining whether one or more aerial vehicles is to be added or connected to the aerial vehicle configuration, as at 810. For example, an aerial vehicle may be connected to an aerial vehicle configuration via a fixed or releasable connection of a tether. Connection of a fixed connection may be effected by manual connection or connection with the aid of one or more automated tools or machines, whereas connection of a releasable connection may be effected automatically by a controller and/or a tether mechanism of the aerial vehicle.

If one or more aerial vehicles is to be added or connected to the aerial vehicle configuration, then the process 800 may continue by connecting the one or more aerial vehicles to the aerial vehicle configuration, as at 812. For example, if the changed operating parameter relates to a transition in a flight plan between VTOL operations to horizontal flight operations, one or more additional aerial vehicles may be needed for VTOL operations and thus connected to the aerial vehicle configuration. As another example, if the changed operating parameter relates to a malfunctioning aerial vehicle or an aerial vehicle with insufficient power or range, the malfunctioning or insufficient aerial vehicle may be disconnected from the aerial vehicle configuration, and a new aerial vehicle may be connected to the aerial vehicle configuration. Further, if the changed operating parameter relates to a change in the environment, e.g., from low winds to high winds, one or more aerial vehicles may be needed for safe and stable operation and thus connected to the aerial vehicle configuration. In addition, the one or more aerial vehicles, including the added aerial vehicle, of the aerial vehicle configuration may include one or more sensors to receive, detect, and/or sense aspects of other aerial vehicles in the aerial vehicle configuration and/or a payload, in order to collectively form and/or maintain relative positions, altitudes, and/or orientations of the aerial vehicles and/or the payload.

FIG. 9 is a block diagram illustrating various components of an aerial vehicle control system 215, according to an implementation.

In various examples, the block diagram may be illustrative of one or more aspects of the aerial vehicle control system 215 that may be used to implement the various systems and processes discussed above. In the illustrated implementation, the aerial vehicle control system 215 includes one or more processors 902, coupled to a non-transitory computer readable storage medium 920 via an input/output (I/O) interface 910. The aerial vehicle control system 215 may also include a propulsion controller 904, a power controller/supply module 906 and/or a navigation system 908. The aerial vehicle control system 215 may further include a sensor controller 912, a tether mechanism controller 914, a network interface 916, and one or more input/output devices 918.

In various implementations, the aerial vehicle control system 215 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, and payload, task, aerial vehicle, operating parameter, tether, sensor, environment, aerial vehicle configuration, and/or other data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922, data storage 924 and payload, task, aerial vehicle, operating parameter, tether, and sensor data 926, respectively. In other implementations, program instructions, data and/or payload, task, aerial vehicle, operating parameter, tether, and sensor data may be received, sent or stored upon different types of computer-accessible media, such as non-transitory media, or on similar media separate from the non-transitory computer readable storage medium 920 or the aerial vehicle control system 215. Payload, task, aerial vehicle, operating parameter, tether, and sensor data 926 may include any data and aspects related to payloads, tasks, flight plans, environments, aerial vehicles, components of aerial vehicles including tethers and sensors, aerial vehicle configurations including types, numbers, arrangements, combinations, and/or orientations of aerial vehicles as part of reconfigurable aerial vehicle configurations, operating parameters and any other received, detected, sensed, and/or monitored data, and/or any other data items described herein.

Generally speaking, a non-transitory, computer readable storage medium may include storage media or memory media such as magnetic or optical media, e.g., disk or CD/DVD-ROM, coupled to the aerial vehicle control system 215 via the I/O interface 910. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface 916 or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The propulsion controller 904 communicates with the navigation system 908 and adjusts the operational characteristics of each propulsion mechanism to guide the aerial vehicle along a flight plan and/or to perform other navigational maneuvers. The navigation system 908 may include a GPS or other similar system than can be used to navigate the aerial vehicle to and/or from a location. In addition, with respect to reconfigurable aerial vehicle configurations, the propulsion controllers 904 and/or the navigation systems 908 of the aerial vehicle control systems 215 of a plurality of aerial vehicles in an aerial vehicle configuration may cooperate and communicate to form, maintain, and/or modify relative angular positions, radial positions, altitudes, and/or orientations of the plurality of aerial vehicles relative to each other and/or to a payload carried by the reconfigurable aerial vehicle configuration.

The aerial vehicle control system 215 may also include a sensor controller 912. The sensor controller 912 may coordinate operations of one or more sensors and other controllers of an aerial vehicle, as well as cooperate and communicate with other sensor controllers 912 of other aerial vehicles in an aerial vehicle configuration in order to receive, detect, and/or sense other aerial vehicles and/or a payload, such that relative angular positions, radial positions, altitudes, and/or orientations of the plurality of aerial vehicles relative to each other and/or to a payload carried by the reconfigurable aerial vehicle configuration may be formed, maintained, and/or modified. For example, the sensor controller of one aerial vehicle in an aerial vehicle configuration may receive, from one or more sensors, data associated with another aerial vehicle in the aerial vehicle configuration, and based at least in part on data associated with the aerial vehicle configuration related to relative positions, altitudes, and/or orientations of the aerial vehicles, communicate with the propulsion controller 904, the navigation system 908, and/or a tether mechanism controller 914, as described herein, to form, maintain, and/or modify the aerial vehicle configuration.

The aerial vehicle control system 215 may also include a tether mechanism controller 914. The tether mechanism controller 914 may control aspects of the tether, including attachment, release, extension, retraction, telescoping, stiffness/flexibility modification, suction, magnetism, cutting, or any other aspects. In addition, with respect to reconfigurable aerial vehicle configurations, the tether mechanism controllers 914 of the aerial vehicle control systems 215 of a plurality of aerial vehicles in an aerial vehicle configuration may cooperate and communicate to form, maintain, and/or modify relative angular positions, radial positions, altitudes, and/or orientations of the plurality of aerial vehicles relative to each other and/or to a payload carried by the reconfigurable aerial vehicle configuration.

The network interface 916 may be configured to allow data to be exchanged between the aerial vehicle control system 215, other devices attached to a network, such as other computer systems, aerial vehicle control systems of other individual aerial vehicles, aerial vehicle control systems of other aerial vehicles in an aerial vehicle configuration, and/or a reconfigurable aerial vehicle configuration management system that may control, instruct, and/or manage individual aerial vehicles, a plurality of aerial vehicles and/or a plurality of aerial vehicle configurations. For example, the network interface 916 may enable wireless communication between numerous aerial vehicles and/or aerial vehicle configurations. In various implementations, the network interface 916 may support communication via wireless general data networks, such as a Wi-Fi network. For example, the network interface 916 may support communication via telecommunications networks such as cellular communication networks, satellite networks, and the like.

Input/output devices 918 may, in some implementations, include one or more displays, microphones, audio output devices, input devices, image capture devices, thermal sensors, infrared sensors, time-of-flight sensors, radar sensors, LIDAR sensors, inertial measurement units, accelerometers, gyroscopes, altimeters, pressure sensors, weather sensors, GPS sensors, other location sensors, or other sensors described herein. Multiple input/output devices 918 may be present and controlled by the aerial vehicle control system 215. One or more of these sensors may be utilized to assist in the operations of aerial vehicles and/or aerial vehicle configurations.

As shown in FIG. 9, the memory may include program instructions 922 which may be configured to implement the example processes and/or sub-processes described above. The data storage 924 may include various data stores for maintaining data items, and the payload, task, aerial vehicle, operating parameter, tether, and sensor data 926 may include, for example, data related to any aspects of the various aerial vehicles, components of the aerial vehicles, aerial vehicle configurations, payloads, tasks, flight plans, environments, and any other conditions of aspects related to formation, operation, and/or reconfiguration of the aerial vehicles and/or aerial vehicle configurations as described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the aerial vehicle control system 215 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The aerial vehicle control system 215 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 215. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle control system 215 may be transmitted to the aerial vehicle control system 215 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other aerial vehicle control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A distributed, reconfigurable aerial vehicle configuration, comprising:
   a plurality of aerial vehicles, each of the plurality of aerial vehicles including:
      a body;
      a controller housed within the body;
      two motors housed within the body;
      two stacked, counter-rotating propellers, each propeller configured to be rotated by a respective motor; and
      a tether connected to the body at a first end, wherein the tether comprises at least one of a cable or a wire, and the tether includes a piezoelectric element configured to modify a stiffness of the at least one of the cable or the wire; and
   a payload connected to second ends of respective tethers of the plurality of aerial vehicles and configured to be carried by the plurality of aerial vehicles;
   wherein the payload comprises at least one of an airfoil cross-section or a fixed wing shape;
   wherein each controller of a respective aerial vehicle is configured to control operations of the respective aerial vehicle responsive to operation independently of the aerial vehicle configuration; and
   wherein the controllers of the plurality of aerial vehicles are configured to collectively control operations of the plurality of aerial vehicles responsive to operation collectively as the aerial vehicle configuration.

2. The aerial vehicle configuration of claim 1, wherein each of the plurality of aerial vehicles further includes:
   a tether mechanism including at least one of a cutting element or a heating element configured to disconnect the tether.

3. The aerial vehicle configuration of claim 1, wherein the tether is at least one of extendible, retractable, telescoping, fixed, or releasable.

4. The aerial vehicle configuration of claim 1, wherein the payload is connected to the second ends of respective tethers via at least one of ball and socket connections, fasteners, adhesives, key and keyhole connections, hook and ring connections, screwed or threaded connections, bayonet-type connections, magnetic connections, or suction connections.

5. A reconfigurable aerial vehicle configuration, comprising:
   at least two aerial vehicles, each of the at least two aerial vehicles including:
      a body;
      controller;
      at least two propellers, each of the at least two propellers configured to be rotated by a respected motor; and
      a tether connected to the body at a first end, wherein the tether comprises at least one of a cable or a wire, and the tether includes a piezoelectric element configured to modify a stiffness of the at least one of the cable or the wire; and
   a payload connected to second ends of respective tethers of the at least two aerial vehicles and configured to be carried by the at least two aerial vehicles; wherein the payload comprises at least one of an airfoil cross-section or a fixed wing shape.

6. The aerial vehicle configuration of claim 5, wherein the at least two propellers comprise stacked, counter-rotating propellers.

7. The aerial vehicle configuration of claim 5, wherein each of the at least two aerial vehicles further includes a plurality of sensors configured to detect positions of at least one other aerial vehicle or the payload.

8. The aerial vehicle configuration of claim 7, wherein the plurality of sensors include at least one of time-of-flight sensors, radar sensors, LIDAR sensors, or image capture devices.

9. The aerial vehicle configuration of claim 7, wherein respective controllers of the at least two aerial vehicles are configured to collectively control operation of the aerial vehicle configuration based at least in part on the detected positions of at least one other aerial vehicle or the payload.

10. The aerial vehicle configuration of claim 5, wherein the tether is at least one of extendible, retractable, telescoping, fixed, or releasable.

11. The aerial vehicle configuration of claim 10, wherein the controller is configured to at least one of attach, release, extend, or retract the tether via a tether mechanism to modify the aerial vehicle configuration; and
   wherein the tether mechanism includes at least one of a cutting element or a heating element configured to disconnect the tether.

12. The aerial vehicle configuration of claim 5, wherein the controller is configured to modify the aerial vehicle configuration based at least in part on at least one of a flight plan, an environment, a status of the aerial vehicle configuration, or a status of one of the at least two aerial vehicles.

13. A method to operate an aerial vehicle configuration, comprising:
   connecting at least two aerial vehicles to a payload via respective tethers, each of the at least two aerial vehicles including a body, a controller, and at least two propellers configured to be rotated by respective motors;
   operating the at least two aerial vehicles in a first configuration to perform a task associated with the payload, wherein the first configuration includes respective positions of the at least two aerial vehicles relative to each other and the payload;
   determining that an operating parameter associated with the task has changed; and
   modifying the aerial vehicle configuration from the first configuration to a second configuration based at least in part on the operating parameter: wherein the respective tethers comprise at least one of a cable or a wire, and the respective tethers include respective piezoelectric elements configured to modify a stiffness of the at least one of the cable or the wire: wherein the payload comprises at least one of an airfoil cross-section or a fixed wing shape.

14. The method of claim 13, further comprising:
   determining at least one of a type or a number of the at least two aerial vehicles to connect to the payload based at least in part on at least one of information associated with the payload or information associated with the task to be completed with respect to the payload.

15. The method of claim 13, wherein the operating parameter includes at least one of a flight plan, an environment, a status of the first configuration, or a status of one of the at least two aerial vehicles.

16. The method of claim 13, wherein modifying the aerial vehicle configuration from the first configuration to the second configuration comprises modifying at least one of an angular position, a radial position, an altitude, or an orientation of a first aerial vehicle of the at least two aerial vehicles relative to a second aerial vehicle of the at least two aerial vehicles and the payload.

17. The method of claim 16, wherein the second configuration includes the first aerial vehicle positioned in one of a horizontal pulling orientation and a horizontal pushing orientation.

18. The method of claim 13, wherein modifying the aerial vehicle configuration from the first configuration to the second configuration comprises releasing a first aerial vehicle of the at least two aerial vehicles via a respective tether from the payload.

19. The method of claim 13, wherein modifying the aerial vehicle configuration from the first configuration to the second configuration comprises connecting an additional aerial vehicle via a respective tether to the payload.

* * * * *